(12) United States Patent
Heath et al.

(10) Patent No.: US 11,459,098 B2
(45) Date of Patent: Oct. 4, 2022

(54) VARIABLE SPEED TRANSMISSION AND RELATED METHODS

(71) Applicant: The Boeing Company, Chicago, IL (US)

(72) Inventors: Gregory Forrest Heath, Apache Junction, AZ (US); Stephen C. Slaughter, Scottsdale, AZ (US); Robert J. Atmur, Whittier, CA (US); William Patrick Sargent, Fullerton, CA (US); Tse-hua Shen, Phoenix, AZ (US); Bryant Scott Owen, San Tan Valley, AZ (US); Alice A. Murphy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 16/698,742

(22) Filed: Nov. 27, 2019

(65) Prior Publication Data

US 2021/0155341 A1    May 27, 2021

(51) Int. Cl.
| | |
|---|---|
| *F16H 3/72* | (2006.01) |
| *B64C 27/82* | (2006.01) |
| *F16H 3/46* | (2006.01) |
| *F16H 57/10* | (2006.01) |
| *B64C 27/06* | (2006.01) |

(Continued)

(52) U.S. Cl.
CPC .............. *B64C 27/82* (2013.01); *B64C 27/06* (2013.01); *B64D 35/04* (2013.01); *F16H 3/46* (2013.01); *F16H 3/724* (2013.01); *F16H 57/10* (2013.01); *B64C 2027/8209* (2013.01);

(Continued)

(58) Field of Classification Search
CPC . B64C 27/82; B64C 27/06; B64C 2027/8209; B64C 27/12; B64C 2027/125; B64D 35/04; F16H 3/46; F16H 3/724; F16H 57/10; F16H 2200/2005; F16H 2716/08; H02K 7/116; H02K 7/1025
See application file for complete search history.

(56) References Cited

U.S. PATENT DOCUMENTS

| | | |
|---|---|---|
| 37,165 A | 12/1862 | Gary |
| 1,611,981 A | 12/1926 | Amberg |

(Continued)

FOREIGN PATENT DOCUMENTS

| | | |
|---|---|---|
| CH | 233459 A | 7/1944 |
| CN | 2276093 Y | 3/1998 |

(Continued)

OTHER PUBLICATIONS

Antonio S de Castro; Exploring a rehnomic system; Dec. 23, 1999, retrieved from the internet at https://arxiv.org/pdf/physics/9912049.pdf, 6 pages.

(Continued)

*Primary Examiner* — Justin Holmes
(74) *Attorney, Agent, or Firm* — Kolisch Hartwell, P.C.

(57) ABSTRACT

A variable speed transmission is disclosed, with a transmission apparatus which includes a planetary gear set having a ring gear and a sun gear. The variable speed transmission further includes a primary engine for powering the sun gear, a braking device engaging the ring gear, and a controller configured to alter the rotational speed of the ring gear by adjusting the braking device.

20 Claims, 7 Drawing Sheets

(51) Int. Cl.
*B64D 35/04* (2006.01)
*H02K 7/116* (2006.01)
(52) U.S. Cl.
CPC .. *F16H 2200/2005* (2013.01); *F16H 2716/08* (2013.01); *H02K 7/116* (2013.01)

(56) References Cited

U.S. PATENT DOCUMENTS

| | | |
|---|---|---|
| 2,275,827 A | 3/1942 | Plensler |
| 2,458,983 A | 1/1949 | Dunn |
| 2,509,391 A | 5/1950 | Hansen et al. |
| 2,699,690 A | 1/1955 | Kobler |
| 2,703,370 A | 3/1955 | Steensen |
| 2,857,536 A | 10/1958 | Light |
| 2,866,110 A | 12/1958 | Schon |
| 2,871,382 A | 1/1959 | Bouvier |
| 2,908,191 A | 10/1959 | Sundt |
| 3,117,244 A | 1/1964 | Rosain et al. |
| 3,234,393 A | 2/1966 | Ruschmann |
| 3,249,776 A | 5/1966 | Anderson et al. |
| 3,322,984 A | 5/1967 | Anderson |
| 3,341,726 A | 9/1967 | Brinster et al. |
| 3,385,135 A | 5/1968 | Strangberg |
| 3,428,839 A | 2/1969 | Singleton et al. |
| 3,436,571 A | 4/1969 | French |
| 3,463,953 A | 8/1969 | Maxwell |
| 3,474,272 A | 10/1969 | Newell |
| 3,525,890 A | 8/1970 | Buchanan, Jr. |
| 3,539,847 A | 11/1970 | Gifford |
| 3,579,276 A | 5/1971 | Newell |
| 3,640,154 A | 2/1972 | Massie |
| 3,918,315 A | 11/1975 | Rouverol |
| 3,935,750 A | 2/1976 | Maroth |
| 4,041,808 A | 8/1977 | Ficklerscher |
| RE29,411 E | 9/1977 | Newell |
| 4,081,702 A | 3/1978 | Nuemann |
| 4,108,017 A | 8/1978 | Rouverol |
| 4,330,725 A | 5/1982 | Hintz |
| 4,495,432 A | 1/1985 | Katsuma et al. |
| 4,906,881 A | 3/1990 | Knight |
| 5,111,102 A | 5/1992 | Meeks |
| 5,383,821 A | 1/1995 | Murakami et al. |
| 5,747,915 A | 5/1998 | Benavides |
| 5,804,898 A | 9/1998 | Kawai |
| 5,820,504 A | 10/1998 | Geralde |
| 5,893,813 A | 4/1999 | Yamamoto |
| 5,906,142 A | 5/1999 | Shirasawa |
| 5,954,610 A | 9/1999 | Kamimura |
| 6,131,459 A | 10/2000 | Seale et al. |
| 6,286,391 B1 | 9/2001 | Gassmann |
| 6,431,330 B1 | 8/2002 | Poertgen et al. |
| 6,568,929 B2 | 5/2003 | Takagi |
| 6,664,711 B2 | 12/2003 | Baudendistel |
| 7,165,473 B2 | 1/2007 | Kobayashi et al. |
| 7,540,865 B2 | 6/2009 | Griffin et al. |
| 7,824,345 B2 | 11/2010 | Euteneuer et al. |
| 7,841,994 B2 | 11/2010 | Skujins et al. |
| 7,850,623 B2 | 12/2010 | Griffin et al. |
| 7,878,984 B2 | 2/2011 | Jacobsen et al. |
| 7,914,466 B2 | 3/2011 | Davis et al. |
| 7,914,467 B2 | 3/2011 | Layman et al. |
| 7,969,055 B2 | 6/2011 | Titus |
| 8,022,331 B2 | 9/2011 | Reynolds et al. |
| 8,048,004 B2 | 11/2011 | Davis et al. |
| 8,048,060 B2 | 11/2011 | Griffin et al. |
| 8,105,246 B2 | 1/2012 | Voeller et al. |
| 8,137,293 B2 | 3/2012 | Zhou et al. |
| 8,169,118 B2 | 5/2012 | Filatov |
| 8,182,465 B2 | 5/2012 | Griffin et al. |
| 8,210,070 B2 | 7/2012 | Takahashi et al. |
| 8,231,551 B2 | 7/2012 | Griffin et al. |
| 8,257,279 B2 | 9/2012 | Davis et al. |
| 8,368,269 B2 | 2/2013 | Titus |
| 8,376,961 B2 | 2/2013 | Layman et al. |
| 8,377,035 B2 | 2/2013 | Zhou et al. |
| 8,409,114 B2 | 4/2013 | Parins |
| 8,449,526 B2 | 5/2013 | Snyder et al. |
| 8,535,243 B2 | 9/2013 | Shireman |
| 8,551,020 B2 | 10/2013 | Chen et al. |
| 8,551,021 B2 | 10/2013 | Voeller et al. |
| 8,556,914 B2 | 10/2013 | Vrba |
| 8,636,716 B2 | 1/2014 | Griffin et al. |
| 8,646,360 B2 | 2/2014 | Kanai |
| 8,936,525 B2 | 1/2015 | Shimada |
| 9,124,150 B2 | 9/2015 | Atmur |
| 9,164,497 B2 | 10/2015 | Cameron et al. |
| 9,243,700 B1 * | 1/2016 | DeBoth ............... F16H 37/0826 |
| 9,281,736 B2 | 3/2016 | Atmur |
| 9,303,971 B1 | 4/2016 | Butscher et al. |
| 9,404,489 B1 | 8/2016 | Atmur |
| 9,427,866 B2 | 8/2016 | Hasegawa |
| 9,484,828 B2 | 11/2016 | Atmur |
| 9,768,664 B2 | 9/2017 | Atmur et al. |
| 9,929,623 B2 | 3/2018 | Atmur et al. |
| 10,024,391 B2 | 7/2018 | Atmur |
| 10,164,501 B2 | 12/2018 | Atmur et al. |
| 10,203,022 B2 | 2/2019 | Atmur et al. |
| 10,215,244 B2 | 2/2019 | Atmur et al. |
| 10,267,383 B2 | 4/2019 | Atmur et al. |
| 10,392,094 B2 | 8/2019 | Atmur et al. |
| 2008/0223640 A1 * | 9/2008 | Clauson ................ F16H 3/724 180/69.6 |
| 2009/0064812 A1 | 3/2009 | Gutmann et al. |
| 2010/0029428 A1 * | 2/2010 | Abe ....................... B60K 6/365 475/5 |
| 2010/0224435 A1 | 9/2010 | Yamamori |
| 2011/0162471 A1 | 7/2011 | Takahashi et al. |
| 2013/0097865 A1 | 4/2013 | Ando et al. |
| 2013/0134803 A1 | 5/2013 | Goepel |
| 2013/0319145 A1 | 12/2013 | Shimada |
| 2014/0246893 A1 | 9/2014 | Tesar |
| 2014/0285072 A1 | 9/2014 | Atmur et al. |
| 2015/0015174 A1 | 1/2015 | Atmur |
| 2015/0024896 A1 | 1/2015 | Takahashi et al. |
| 2015/0091491 A1 | 4/2015 | Cameron et al. |
| 2015/0209966 A1 | 6/2015 | Hasegawa |
| 2015/0224642 A1 | 8/2015 | Hasegawa |
| 2015/0340912 A1 | 11/2015 | Calley |
| 2016/0172928 A1 | 6/2016 | Atmur |
| 2016/0172929 A1 | 6/2016 | Atmur et al. |
| 2016/0327015 A1 | 11/2016 | Iida et al. |
| 2016/0341283 A1 | 11/2016 | Robuck et al. |
| 2016/0344255 A1 | 11/2016 | Atmur et al. |
| 2017/0122409 A1 | 5/2017 | Atmur et al. |
| 2017/0191549 A1 | 7/2017 | Atmur et al. |
| 2017/0317546 A1 | 11/2017 | Atmur |
| 2018/0034355 A1 | 2/2018 | Peck, Jr. et al. |
| 2018/0252279 A1 | 9/2018 | Atmur et al. |
| 2018/0306278 A1 | 10/2018 | Atmur et al. |
| 2018/0320760 A1 | 11/2018 | Atmur et al. |
| 2018/0346086 A1 | 12/2018 | Atmur et al. |
| 2019/0011027 A1 | 1/2019 | Edelson |
| 2019/0249753 A1 | 8/2019 | Atmur et al. |
| 2019/0264791 A1 | 8/2019 | Atmur et al. |
| 2020/0300316 A1 | 9/2020 | Atmur et al. |

FOREIGN PATENT DOCUMENTS

| | | |
|---|---|---|
| CN | 203098755 U | 7/2013 |
| CN | 104065202 A | 9/2014 |
| CN | 107244377 A * | 10/2017 |
| DE | 10028964 A1 | 1/2002 |
| DE | 10237686 A1 | 2/2004 |
| DE | 102009002587 A1 | 10/2010 |
| DE | 10237686 B4 | 4/2013 |
| EP | 0565746 A1 | 10/1993 |
| EP | 0719959 A1 | 7/1996 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |
| EP | 3096444 A1 | 11/2016 |

(56) References Cited

FOREIGN PATENT DOCUMENTS

| EP | 3165789 A2 | | 5/2017 | |
|---|---|---|---|---|
| EP | 3240165 A1 | * | 11/2017 | ............... H02K 1/17 |
| EP | 3473889 A1 | * | 4/2019 | ............. F16H 3/724 |
| GB | 570404 A | * | 7/1945 | ............. B64C 27/12 |
| GB | 2216982 A | | 3/1989 | |
| GB | 2211900 A | | 7/1989 | |
| GB | 2211900 B | | 7/1989 | |
| GB | 2327998 A | | 2/1999 | |
| JP | S59113345 A | | 6/1984 | |
| JP | 6017749 A | | 1/1985 | |
| JP | S6246045 A | | 2/1987 | |
| JP | 2014187867 A | | 10/2014 | |
| JP | 2015039286 A | | 2/2015 | |
| WO | 2008149696 A1 | | 12/2008 | |
| WO | 2011154981 A1 | | 12/2011 | |
| WO | 2014034320 A1 | | 3/2014 | |
| WO | 2014051131 A1 | | 4/2014 | |
| WO | 2014076772 A1 | | 5/2014 | |
| WO | 2014107474 A1 | | 7/2014 | |
| WO | 2014118284 A2 | | 8/2014 | |
| WO | WO-2015110618 A2 | * | 7/2015 | ............. H02K 7/085 |
| WO | WO-2019172582 A1 | * | 9/2019 | ............. B62M 6/55 |

OTHER PUBLICATIONS

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., An electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Susman, Zeke, Harmonic Drive, EVE5320 Mechatronics, Department of Electrical and Computer Engineering, Utah State University, Mar. 11, 2010, retrieved from the internet on Feb. 18, 2015 from http://mechatronics.ece.usu.edu/ece5320/Schedule/hw01-2010/hw1_Zeke_Susman_a.ppt, 27 pages.

Lipton, Tom, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

Francesco Fasso et al., Conservation of energy and momenta in nonholonomic systems with affine constraints, May 5, 2015, 16 pages.

European Patent Office, Extended European Search Report in European Patent Application No. 16156922.3-1806, dated Sep. 30, 2016, 6 pages.

European Patent Office, Extended European Search Report in European Patent Application No. 16196546.2-1762, dated May 3, 2017, 9 pages.

European Patent Office, Extended European Search Report in European Patent Application No. 16194812.0-1762, dated Jun. 7, 2017, 8 pages.

U.S. Patent and Trademark Office, Non-Final Office Action in U.S. Appl. No. 14/989,760, dated Sep. 21, 2017, 40 pages.

European Patent Office, Extended European Search Report in European Patent Application No. 17167409.6-1809, dated Sep. 22, 2017, 9 pages.

U.S. Patent and Trademark Office, Non-Final Office Action in U.S. Appl. No. 14/932,901, dated Feb. 23, 2018, 48 pages.

U.S. Patent and Trademark Office, Non-Final Office Action in U.S. Appl. No. 15/585,544, dated Jul. 11, 2018, 68 pages.

U.S. Patent and Trademark Office, Non-Final Office Action in U.S. Appl. No. 15/141,782, dated Oct. 4, 2018, 67 pages.

European Patent Office, Extended European Search Report regarding European Patent Application No. 18169556.0-1012, dated Oct. 5, 2018, 10 pages.

European Patent Office, Examination Report in European Patent Application No. 16196546.2-1012, dated Dec. 13, 2018, 5 pages.

U.S. Patent and Trademark Office, Non-Final Office Action in U.S. Appl. No. 15/494,396, dated Jan. 3, 2019, 43 pages.

European Patent Office, Extended European Search Report regarding EP Patent Application No. 18164670.4-1201, dated Jul. 6, 2018, 24 pages.

European Patent Office, Examination Report in European Patent Application No. 17167409.6-1201, dated Mar. 18, 2019, 9 pages.

U.S. Patent and Trademark Office, Final Office Action regardings U.S. Appl. No. 15/141,782, dated Apr. 19, 2019, 26 pages.

European Patent Office, Examination Report regarding EP Patent Application No. 18164670.4-1201, dated May 20, 2019, 17 pages.

U.S. Patent and Trademark Office, Non-Final Office Action regardings U.S. Appl. No. 16/391,209, dated Jul. 25, 2019, 27 pages.

Canadian Intellectual Property Office, Office Action regarding Canadian Patent Application No. 2,959,019, dated Aug. 20, 2019, 4 pages.

European Patent Office, Examination Report regarding European Patent Application No. 18164670.4-1201, dated Oct. 8, 2019, 6 pages.

European Patent Office, Examination Report regarding European Patent Application No. 17167409.6, dated Oct. 10, 2019, 6 pages.

European Patent Office, Extended European Search Report regarding European Patent Application No. 20160360.2, dated Sep. 24, 2020, 5 pages.

U.S. Patent and Trademark Office, Non-Final Office Action regarding U.S. Appl. No. 16/357,229, dated Aug. 5, 2020, 36 pages.

* cited by examiner

VARIABLE SPEED TRANSMISSION AND RELATED METHODS

BACKGROUND

Variable speed transmissions improve efficiency by allowing engines to maintain a constant speed while varying output speeds. Most current variable speed transmissions offer only a couple of discrete speeds or a small range of speed variation and use friction-based clutch mechanisms. In high power conditions, such as are common in rotorcraft, engagement between moving components is often rough due to speed differentials and resulting shock loading can lead to drive train instability. Friction-based clutches include many such moving components which undergo frequent engagement and disengagement, generate significant heat, and lead to wear and tear on the components. To compensate, larger, heavier components and cooling systems are needed. A reliable and stable variable speed transmission with a wide speed range and without friction clutch mechanisms is desirable.

SUMMARY

The present disclosure provides systems, apparatuses, and methods relating to variable speed transmissions. In some examples, a variable speed transmission may include a transmission apparatus which includes a planetary gear set having a ring gear and a sun gear. The variable speed transmission may further include a primary engine for powering the sun gear, a braking device engaging the ring gear, and a controller configured to alter the rotational speed of the ring gear by adjusting the braking device.

In some examples, a rotorcraft may include a main body portion, an engine contained in the main body portion, and a first transmission assembly connected to the engine. The first transmission assembly may include a planetary gear set having a planetary ring structure engaging a set of planet gears that orbit a sun gear in a first rotational direction. The rotorcraft may further include a first virtual elliptical drive engaging teeth on an outer circumferential side of the planetary ring structure. The first virtual elliptical drive may be configured to adjust a rotational speed of the planetary ring structure.

In some examples, a method of varying speed of a planetary gear system may include driving planet gears to orbit a sun gear in a first rotational direction. The planet gears may engage a stationary ring gear. The method may further include varying the orbital speed of the planet gears by driving the ring gear in a second rotational direction, opposite from the first rotational direction.

Features, functions, and advantages may be achieved independently in various examples of the present disclosure, or may be combined in yet other examples, further details of which can be seen with reference to the following description and drawings.

DETAILED DESCRIPTION

Various aspects and examples of a variable speed transmission having a virtual elliptical drive (VED), as well as related methods, are described below and illustrated in the associated drawings. Unless otherwise specified, a transmission in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, which are labeled accordingly.

Overview

In general, a variable speed transmission in accordance with the present teachings includes a planetary gear system and one or more secondary drives. A sun gear of the planetary gear system is driven by an input such as a drive shaft from an engine or primary drive. A set of planet gears rotated by the sun gear engage a ring gear, causing the planet gears to orbit the sun gear. Orbital motion of the planet gears rotates a carrier, which in turn provides output. The one or more secondary drives rotate the ring gear, which alters the reference frame of the planet gears. The orbital speed of the planet gears is thereby altered, changing the speed of the carrier output.

The one or more secondary drives may each include an electric motor driving a pericyclic gear set. More specifically, each of the one or more secondary drives may be a Virtual Elliptical Drive (VED) such as is described in Example A below, and in U.S. Patent Publication No.

2017/0317546, U.S. Pat. No. 9,281,736, or U.S. Pat. No. 10,267,383, which are hereby incorporated by reference.

Figure 1:
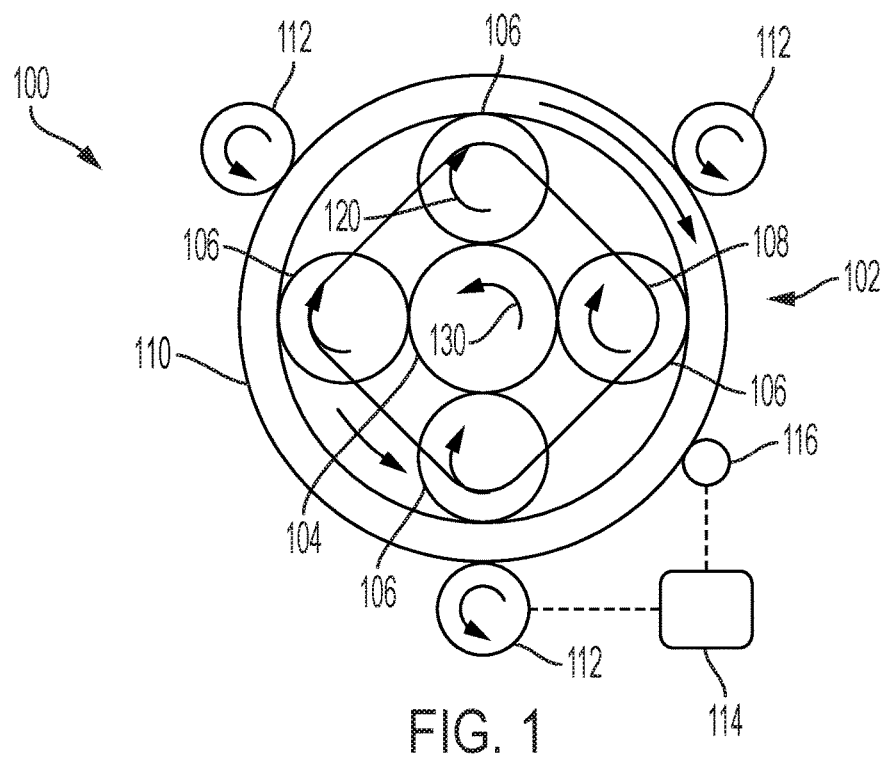
FIG. 1 is a schematic diagram of an illustrative variable speed transmission in accordance with aspects of the present disclosure.

An illustrative variable speed transmission assembly 100 is schematically depicted in FIG. 1. Transmission 100 includes an epicyclic or planetary gear set 102 with a sun gear 104, four planet gears 106, a carrier 108, and a ring gear 110. Similarly to typical planetary gearings, teeth on an exterior circumferential side of the sun gear engage teeth on an exterior circumferential side of each planet gear, which in turn engage teeth on an interior circumferential side of the ring gear. The carrier is rotatably fixed to each of the planet gears. Sun gear 104 is rotationally driven by an engine or motor, not pictured. Rotation of the sun gear causes rotation of planet gears 106. Engagement of the rotating planet gears with ring gear 110 causes the planet gears to orbit around the sun gear. As the planet gears orbit, carrier 108 is rotated and rotation of the carrier is output to a driveshaft or other structure, not pictured.

In transmission 100, unlike typical planetary gearings, ring gear 110 is also configured to rotate. The transmission further includes three secondary drives 112. Each drive engages ring gear 110 to induce rotation of the ring gear. In the present example, an output gear of each secondary drive engages teeth on an external circumferential side of the ring gear.

Rotation of ring gear 110 by secondary drives 112 alters the interaction between planet gears 106 and the ring gear, and thereby alters the conversion of rotational motion of the planet gears into orbital motion. When ring gear 110 is at rest, the gear ratio between the inner side of the ring gear and the planet gears determines a ratio between the rotational and orbital speeds of the planet gears. As the ring gear rotates, the ratio between the rotational and orbital speeds of the planet gears changes proportionally to the rotational speed of the ring gear.

Each element of transmission 100 rotates in either a first direction 120 or a second direction 130, which are depicted as clockwise and counter-clockwise. In FIG. 1, sun gear 104 is shown rotating counter-clockwise. Planet gears 106 accordingly rotate clockwise, and carrier 108 is rotated counter-clockwise. To reduce the rotational speed of carrier 108, the output gears of secondary drives 112 rotate counter-clockwise to cause ring gear 110 to rotate clockwise. The opposing rotation of the orbital reference frame of planet gears 106 reduces the effective orbital speed of the planet gears and thereby reduces the rotational speed of the carrier.

In other words, to slow rotational speed of carrier 108, secondary drives 112 urge ring gear 110 to rotate in an opposite direction to the carrier. To boost the rotational speed of carrier 108, secondary drives 112 urge ring gear 110 to rotate in the same direction as the carrier. The variation of the carrier output speed is inversely proportional to the speed of the ring gear.

Secondary drives 112 may each be configured to provide a continuously variable output speed, from zero to a maximum drive speed. The drives may also be reversable. That is, the drives may be operable from zero to a maximum drive speed in either of a first rotational direction and a second rotational direction. Each drive 112 may be operable in a neutral mode and a drive mode. In the neutral mode, the drive may have zero rotational speed and may draw no power. In the drive mode, the drive may draw power to achieve a selected rotational speed, in either direction.

In the present example, drives 112 are VEDs. As a consequence, in the neutral mode drives 112 may inhibit motion of ring gear 110 only in proportion to the speed of the ring gear. That is, the VEDs may not prevent motion of ring gear 110 from rest, or positively lock the ring gear in a stationary mode, unless operating under power. Accordingly, transmission 100 further includes a positive engagement brake 116. Brake 116 may be engaged to provide mechanical locking of ring gear 110. While ring gear 110 is held stationary by brake 116, transmission 100 may operate at 100% power output without need to energize secondary drives 112.

In the present example, brake 116 engages ring gear 110 directly. For instance, brake 116 may include an electrically or hydraulically actuated toothed brake, configured to engage the teeth on the outer circumferential side of ring gear 110. In some examples, brake 116 may be integrated in one of secondary drives 112. For instance, the brake may engage an output shaft of the secondary drive, braking the output gear of the secondary drive. Locating brake 116 in-line with the output of the secondary drive may provide a relative torque advantage, resulting from the speed difference between the smaller secondary drive and larger ring gear.

Each of secondary drives 112 is connected to a controller 114. Controller 114 may actuate one or more electromagnets of the drive to transition the drive between the neutral and drive modes, and to vary the drive speed. Each drive may be individually controlled as in the present example, or one controller may be used for simultaneous control of the three drives. In some examples, a control circuit may be integrated with each drive. Controller 114 may include a programmable logic controller (PLC), control software on a digital processing system, and/or any effective combination of hardware and software. For example, a control circuit in each drive may be in wired communication with a flight control computer of a rotorcraft.

Positive engagement brake 116 is also operatively connected to controller 114. Secondary drives 112 and positive engagement brake 116 may be operated in coordination to achieve smooth transitions between operational modes of the transmission. For example, the secondary drives may be energized as pressure of the positive engagement brake is gradually decreased, to transition the transmission between full speed and reduced speed operation. Once the brake is fully released, the secondary drives may be gradually increased in speed to achieve a desired output speed reduction for transmission 100.

Continuous variability of the output speed of secondary drives 112 may in turn allow continuous variability of the output speed of transmission 100. For example, a helicopter pilot may use a flight control interface to change a flight mode and software of the helicopter's control system may actuate secondary drives 112 to vary the transmission output speed.

Examples, Components, and Alternatives

The following sections describe selected aspects of exemplary variable speed transmissions as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Helicopter with Variable Speed Transmission

As shown in FIGS. 2-10, this section describes an illustrative helicopter 200, including a main transmission 202 and an aft propulsor transmission 204. The main transmission and aft propulsor transmission are each examples of a variable speed transmission, as described above.

Figure 2:
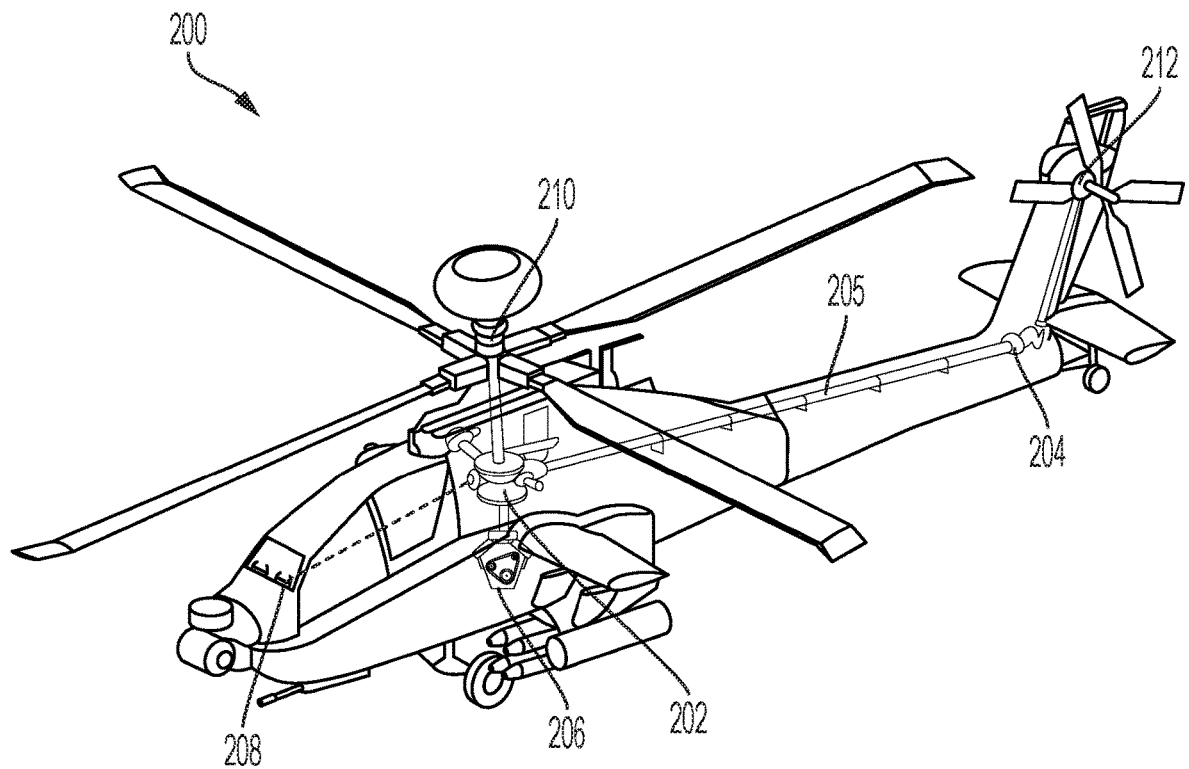
FIG. 2 is an isometric view of a helicopter including another illustrative variable speed transmission.

As shown in FIG. 2, helicopter 200 further includes two main engines 206, and a flight control computer 208. Engines 206 are operatively linked to main transmission 202. Main transmission 202 is in turn operatively linked to a main rotor 210 of the helicopter by a mast and to aft propulsor transmission 204 by a tail drive shaft 205. Aft propulsor transmission 204 drives a rotor 212 at the tail of the helicopter, as described further with reference to FIG. 10, below.

Main transmission 202 is configured to continuously vary the speed of main rotor 210 of the helicopter between a helicopter flight mode and an airplane flight mode, while engine 206 maintains a constant speed. The helicopter mode may refer to a 100% output speed to main rotor 210, while the airplane mode may include a range of reduced output speeds to the main rotor. Speed variation of main transmission 202 occurs at a final planetary stage of the transmission, such that aft propulsor transmission 204 is unaffected by speed variations or changes in the operational mode of main rotor 210. Variation of main transmission 202 is controlled by flight control computer 208, which is linked to control components of the transmission as detailed further below.

Figure 3:
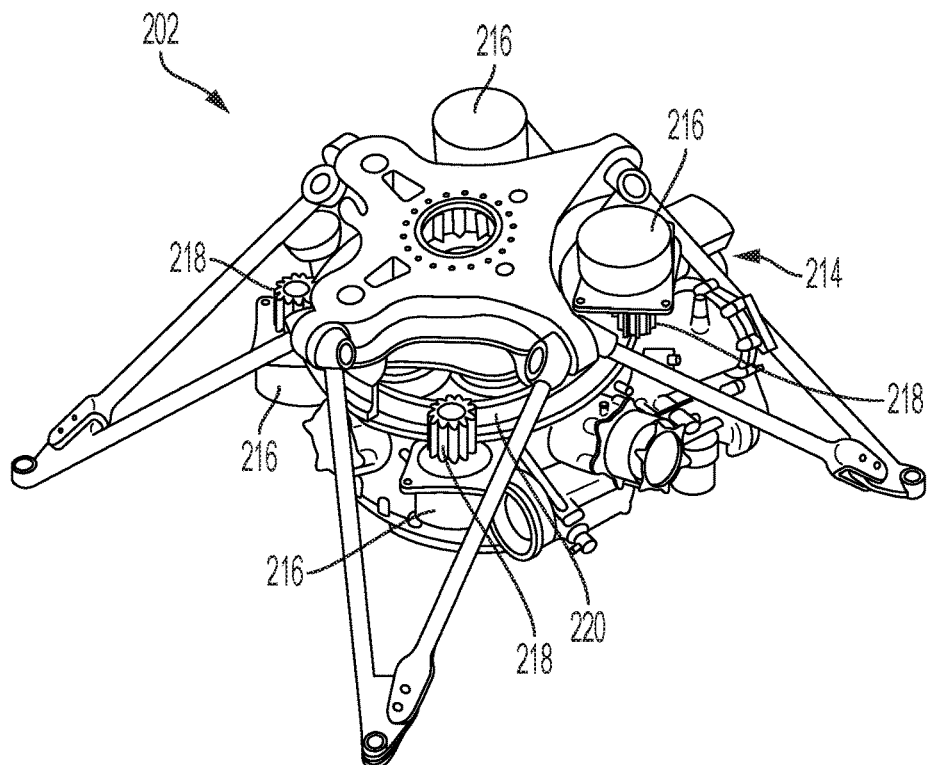
FIG. 3 is an isometric view of the main transmission of the helicopter of FIG. 2.

FIG. 3 is an isometric view of main transmission 202. The transmission includes a planetary gear stage 214 and a plurality of Virtual Elliptical Drives (VEDs) 216. In the present example, main transmission 202 includes four VEDs. Two of VEDs 216 are in a first vertical orientation and the other two of the VEDs are in a second, opposite vertical orientation. Each VED includes an output gear 218, all four of which engage a ring gear 220 of planetary gear stage 214.

In general, transmission 202 may include any effective number of VEDs. That is, the transmission may include any number and configuration of VEDs which supply desired torque and speed. In some examples, transmission 202 may include one or more drives of another type. However, the high torque density of VEDs may be preferable to provide desired torque with limited size and weight. The VEDs may share a single vertical orientation, may have one or more horizontal orientations, and/or may be mounted in any position allowing effective drive of output gear 218 and engagement with ring gear 220.

Figure 4:
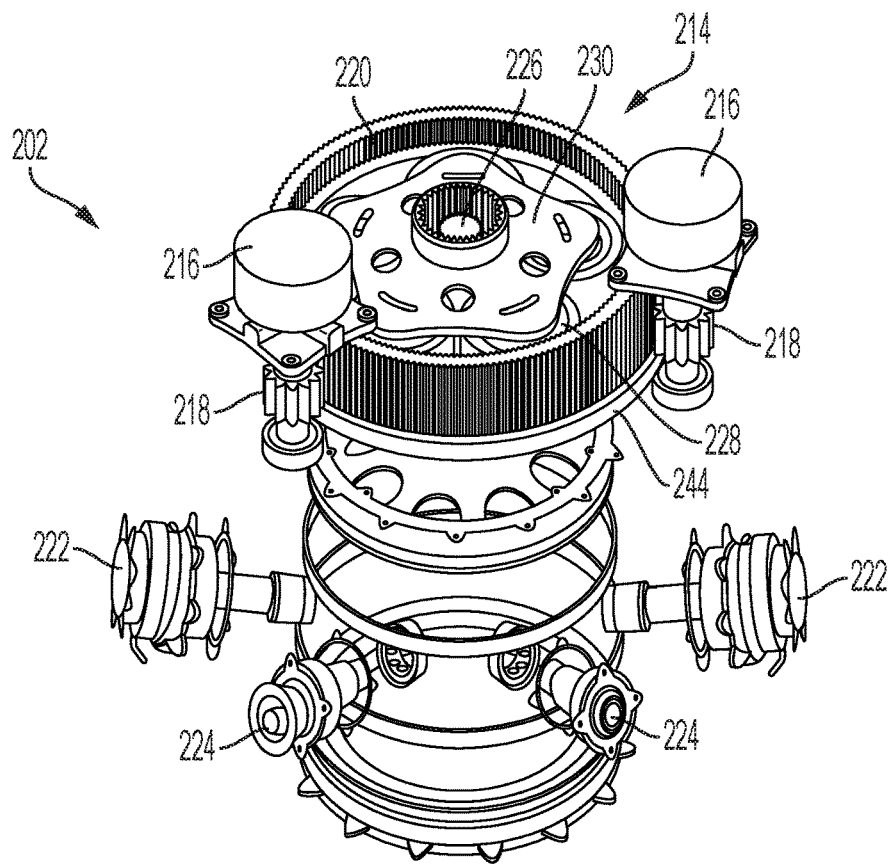
FIG. 4 is an exploded isometric view of selected elements of the transmission of FIG. 3.

FIG. 4 is an exploded view of main transmission 202, with components such as a top cover, mounting struts, and main case omitted. Only two of VEDs 216 are depicted, engaging ring gear 220. As shown, main transmission 202 includes two engine inputs 222 for main engines 206. The inputs may include any effective mechanism, such as an input quill drive and/or a freewheel clutch. In the present example, helicopter 200 includes two prime movers, but transmission 202 may be configured to accommodate a single engine and/or additional inputs. Transmission 202 further includes two accessory outputs 224, and a tail output, not pictured.

Figure 5:
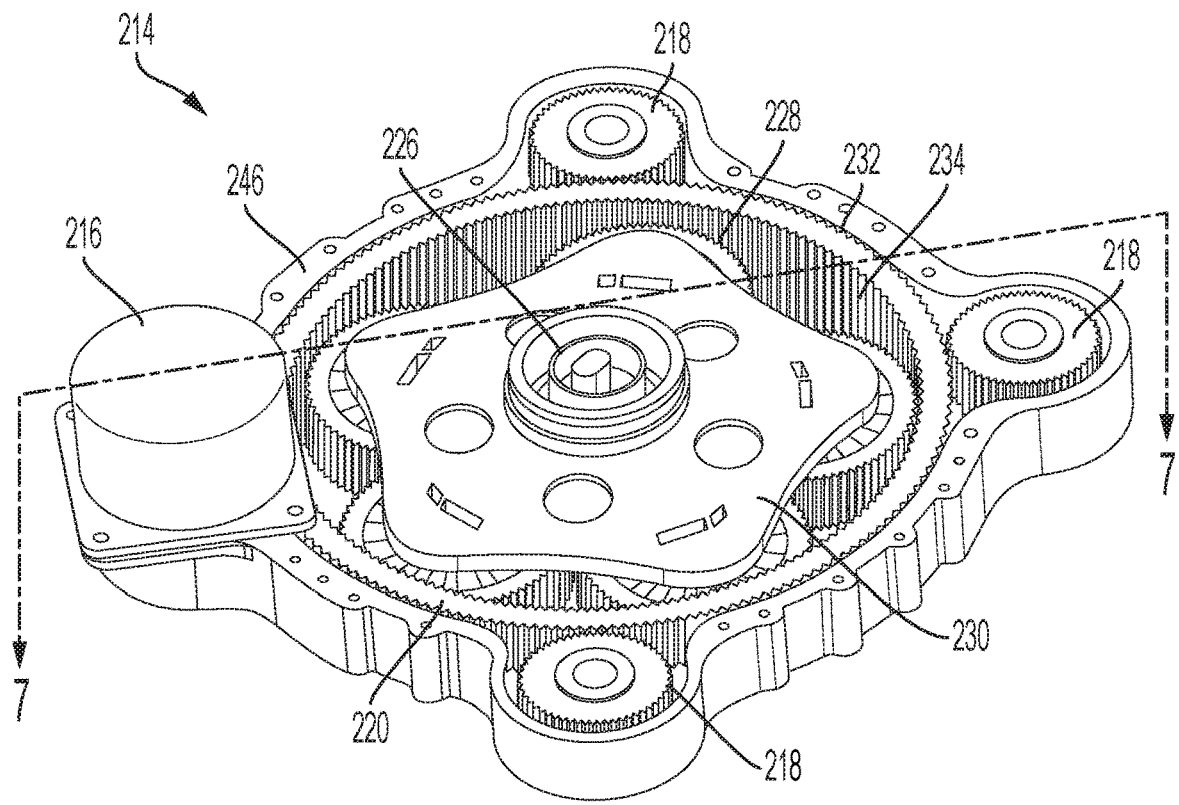
FIG. 5 is an isometric view of the planetary stage of the transmission of FIG. 3.

FIG. 5 shows planetary gear stage 214 in greater detail. In addition to ring gear 220 and VEDs 216, the stage includes a sun gear 226, five planet gears 228, and a carrier 230. One of the four VEDs 216 is shown in full in FIG. 5, while only output gear 218 of the other three VEDs is depicted. For each VED 216, output gear 218 is positioned in engagement with ring gear 220. More specifically, output gear 218 engages an outer gear or set of teeth 232 of ring gear 220.

Figure 6:
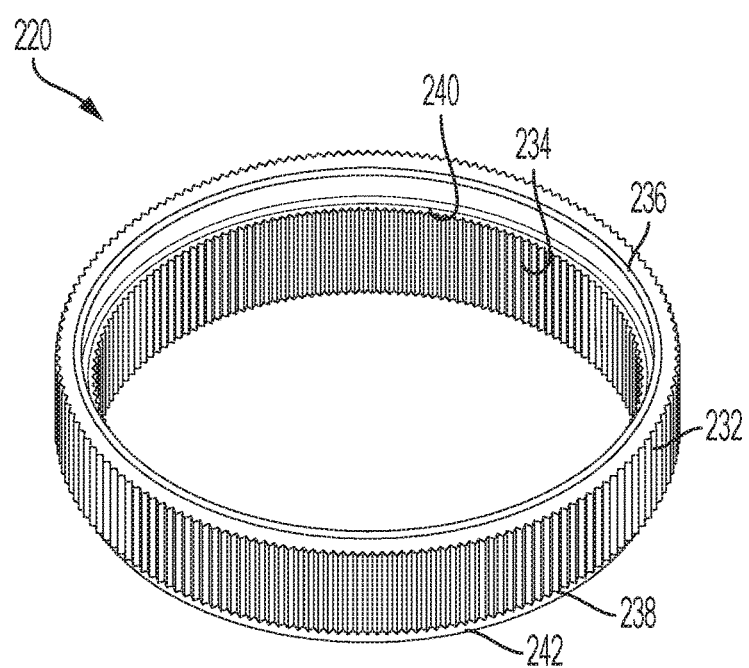
FIG. 6 is an isometric view of the ring gear of the transmission of FIG. 3.

Teeth 232 of ring gear 220 are shown more clearly in FIG. 6. Ring gear 220 further includes an inner set of teeth 234. Each of the inner and outer sets of teeth extend radially from a cylindrical main body 236. Main body 236 may be described as tubular or annular, and has an outer surface 238 and an inner surface 240. Inner set of teeth 234 extend radially inward from inner surface 240, and outer set of teeth 232 extend radially outward from outer surface 238. Outer surface 238 also includes a bearing surface 242, configured to conform to a bearing collar.

Figure 7:
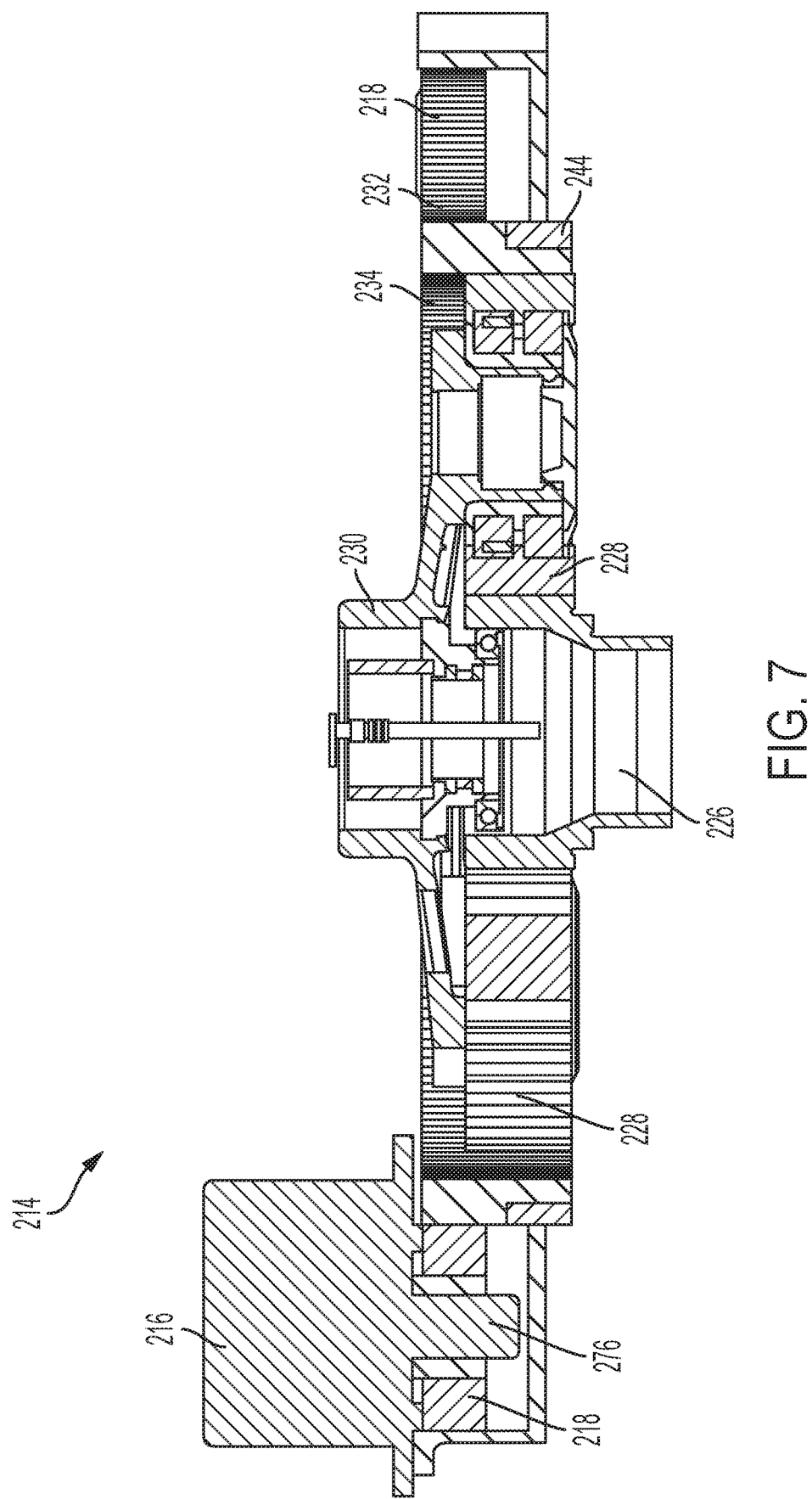
FIG. 7 is a cross-sectional view of the planetary stage of FIG. 5, along lines 7-7.

In the present example, ring gear 220 is configured to rotate on a single bearing collar 244, as shown in FIG. 7. In some examples, the ring gear may be configured for support on additional bearing collars, one or more different types of bearing, and/or to rotate without bearings. For instance, outer surface 238 may include a second bearing surface on an opposite side of outer set of teeth 232 configured for a second bearing collar. For another instance, inner surface 240 may include a bearing surface on each of two sides of inner set of teeth 234, configured for third and fourth bearing collars.

Referring again to FIG. 5, outer set of teeth 232 and inner set of teeth 234 of ring gear 220 may include any appropriate number of teeth. The number of teeth in the inner and outer sets may be the same or different. Preferably, each output gear 218 may have a matching number of teeth and the number of teeth in outer set of teeth 232 may be selected to achieve a desired gear ratio between VEDs 216 and ring gear 220. Similarly, each planet gear 228 may have a matching number of teeth, and the number of teeth in inner set of teeth 234 may be selected to achieve a desired gear ratio between the planet gears and ring gear 220.

To vary the output speed of the main transmission, VEDs 216 may be actuated to turn output gears 218. Rotation of the output gears engaged with outer set of teeth 232 of ring gear 220 may in turn rotate the ring gear. Ring gear 220 may rotate relative to a housing or case 246 of planetary gear stage 214.

Throughout, sun gear 226 may rotate at a set speed in a set direction, according to the input from preceding stages of the transmission. Planet gears 228 engaged with the sun gear may accordingly continue to rotate at a set speed in a set direction, according to the rotation of the sun gear and the gear ratio of the planet gears to the sun gear. However, planet gears 228 may orbit sun gear 226 at a varying rotational speed, according to the rotational speed of ring gear 220. Carrier 230 may therefore output to the main rotor mast at a varying rotational speed. As the speed of output gears 218 varies, the rotor speed is changed by a magnitude inversely proportional to the rotational speed of ring gear 220.

VEDs 216 may rotate ring gear 220 in a direction opposite to the rotational direction of carrier 230 to decrease the output speed of the transmission. The VEDs may alternatively rotate ring gear 220 in a direction matching the rotational direction of carrier 230 to increase the output speed of the transmission. The range of increase or decrease in the output speed may depend on a maximum power of VEDs 216. In the present example, the output speed may range between 50% and 110% of a rated output speed of the transmission.

VEDs 216 are configured to drive output gears 218 at a continuously variable speed, from zero to a rated maximum of the VED. The VEDs may be described as acting as braking devices, by decreasing the output speed of planetary gear stage 214. Each VED includes an electromagnetic drive and a pericyclic gear set, as described further below. Such a balanced pericyclic design may provide a large reduction ratio and convert electrical power to mechanical power with exceptionally high torque and efficiency and low size and weight.

Figure 8:
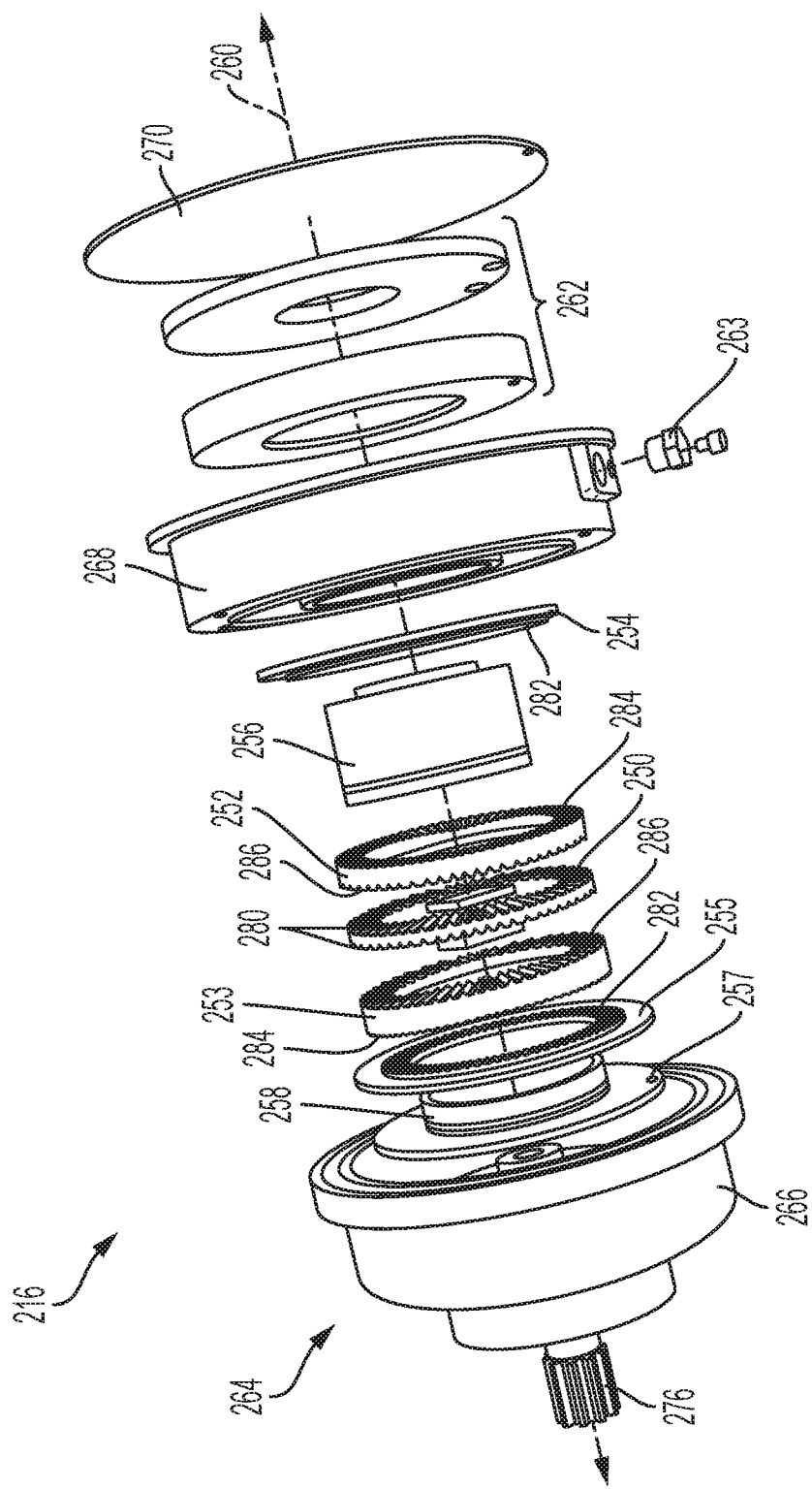
FIG. 8 is an exploded isometric view of one of the virtual elliptical drives (VEDs) of the transmission of FIG. 3.
Figure 9:
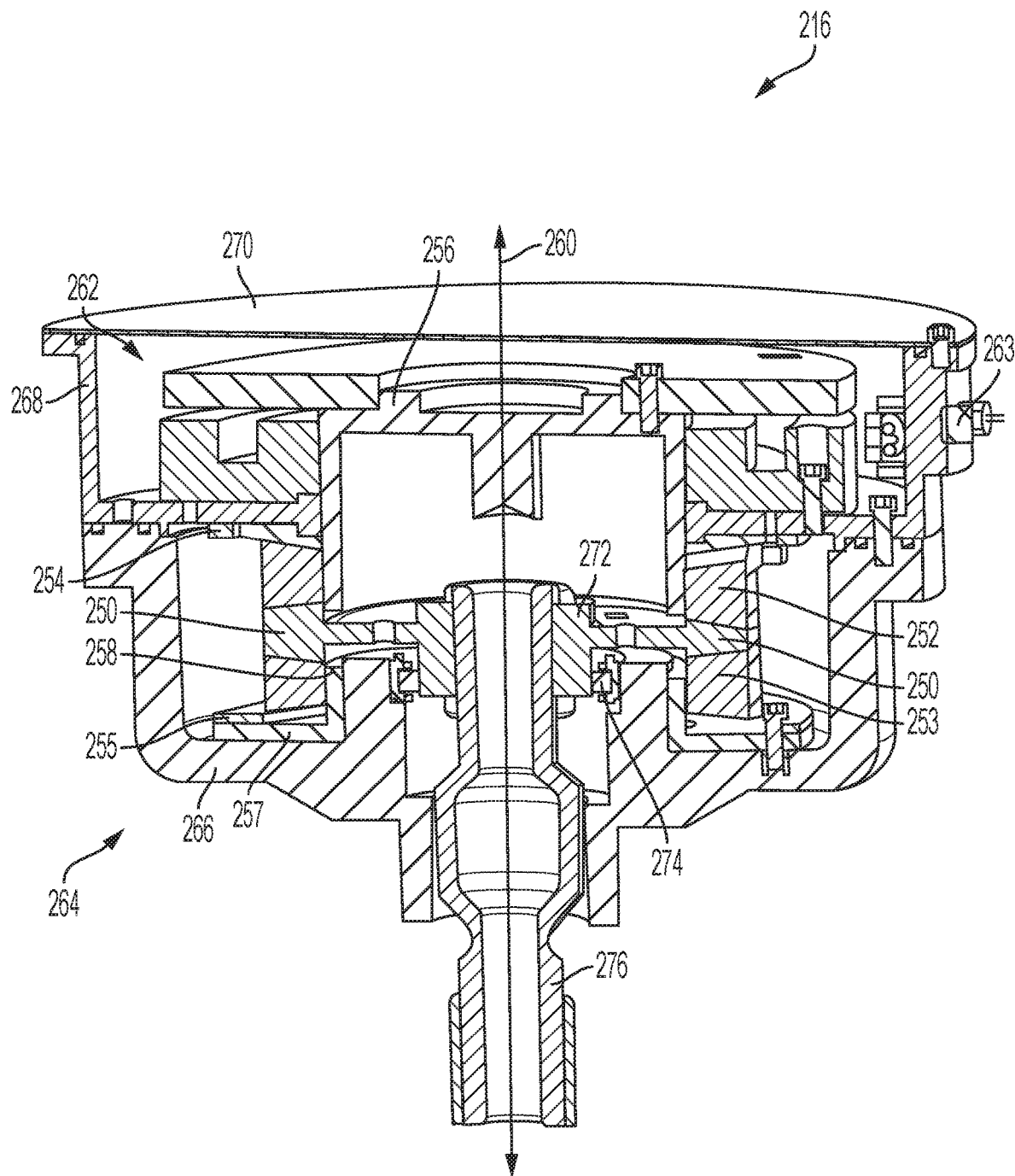
FIG. 9 is a cross-sectional view of the VED of FIG. 8.

FIGS. 8 and 9 depict an illustrative one of VEDs 216. The following description may be understood to apply to each of the four VEDs of planetary stage 214. As shown in FIG. 8, VED 216 includes a rotor 250, a first wobble plate 252, a second wobble plate 253, a first reaction gear 254, and a second reaction gear 255. First wobble plate 252 is disposed between a first side of rotor 250 and first reaction gear 254. Second wobble plate 253 is disposed between a second side of the rotor and second reaction gear 255. Rotor 250 is sandwiched between the two wobble plates. The rotor and wobble plates are in turn sandwiched between the two reaction gears.

VED 216 further includes a hollow cylindrical support or alignment sleeve 256 and an alignment plate 257 with a shoulder 258. Each of reaction gears 254, 255 and wobble plates 252, 253 is annular, with a central aperture. When assembled, sleeve 256 extends through the central apertures of first reaction gear 254 and first wobble plate 252, and the shoulder of alignment plate 257 extends through the central apertures of second reaction gear 255 and second wobble plate 253. Each of the reaction gears, wobble plates, alignment sleeve and alignment plate are coaxial along a central axis 260 of VED 216.

VED 216 further includes an electromagnetic stator assembly 262. The stator assembly is configured to apply electromagnetic forces to the first and second wobble plates 252, 253 to induce nutation of the wobble plates. As each wobble plate nutates, the wobble plate may engage with the corresponding reaction gear, causing the wobble plate to rotate. The wobble plates may each engage with rotor 250, such that rotation of the wobble plates induces rotation of the rotor. As shown in FIG. 8 and described further below, rotor 250 is coupled to an output shaft which drives the output gear.

When assembled, VED 216 is primarily enclosed by a housing 264 which includes a drive housing 266, a stator housing 268, and a cover 270. Housing 264 is configured to support the internal components of VED 216 and facilitate mounting of the VED in the main transmission. Housing 264 as shown in FIGS. 8 and 9 differs slightly in exterior geometry from the housings depicted in FIGS. 3-7, but may be understood to have the same functionality. Any housing providing desired support, protection, and integration into the transmission may be used.

Stator assembly 262 includes a permanent magnet and a set of electromagnetic coils. The permanent magnet and the set of electromagnetic coils are configured to create a magnetic field having a flux density between the stator assembly and each of the first and second wobble plates 252, 253. Each wobble plate includes a magnetically susceptible material configured to respond to the magnetic field, and which may become magnetized in the presence of the magnetic field. Each wobble plate may accordingly experience a force parallel to central axis 260, in a direction toward or away from stator assembly 262.

The stator force may push or pull a first side of each wobble plate against the corresponding reaction gear 254, 255 and a second side of each wobble plate against rotor 250. By rotating a phase of the electromagnetic coils, the stator assembly may rotate the stator force around the circumference of the wobble plates, and thereby induce nutation of the wobble plates. In other words, the permanent magnet and the set of electromagnetic coils may be configured to create a magnetic field with a moving point of highest flux density. The point of highest flux density may move such that the point remains ahead of a point of closest approach between the wobble plates and the stator assembly as the wobble plates nutate.

In some examples, electromagnetic stator assembly 262 may include a controller and/or control circuit configured to regulate a supply of power to the electromagnetic coils of the assembly. In the present example, stator assembly 262 is actuated by an external controller, operatively connected to the stator assembly by electrical connectors 263. The external controller may also be linked to flight control computer 208 of helicopter 200 (See FIG. 2). Electromagnetic stator assembly 262 may referred to as an actuator of VED 216, and may control an output speed of the VED. More specifically, varying the speed of the nutation induced in wobble plates 252, 253 may vary the output speed of the VED.

First wobble plate 252 and second wobble plate 253 each have a central wobble axis. Each wobble plate is angled relative to rotor 250 and reaction gears 254, 255. Each wobble axis may be described as forming a non-zero angle with central axis 260. The wobble angle may be the same for each wobble plate, and the wobble angles may lie in a shared plane. That is, each wobble axis may form the same angle with central axis 260, and the wobble axis of first wobble plate 252 may lie in the same plane with the central axis and the wobble axis of second wobble plate 253.

Wobble plates 252 and 253 may each be described as having a point of closest approach to rotor 250. That is at any time, a point on the outer circumference of the wobble plate may be closest to the rotor. The point may move around the outer circumference of the wobble plate as the wobble plate nutates. At any time, the point of closest approach of first wobble plate 252 may be out of phase with the point of closest approach of second wobble plate 253 by 180 degrees. As the wobble plates nutate and each point of closest approach moves, the same phase shift may be maintained.

First wobble plate 252 and second wobble plate 253 are each configured to rotate about central axis 260 and to nutate such that the wobble axes precess about the central axis. Wobble plates 252, 253 may each be described as rotating with rotor 250 and nutating about the corresponding reaction gear 254, 255. When electromagnetic stator assembly 262 is energized, the wobble plates may be induced to nutate. Nutation about the reaction gears may cause rotation of the wobble plates, and in turn rotate the rotor.

In some examples, only first wobble plate 252 may include a magnetically susceptible material. In such an example, electromagnetic stator assembly 262 may induce nutation of the first wobble plate 252. Nutation of the first wobble plate about first reaction gear 254 may induce rotation of the first wobble plate, which may in turn induce rotation of rotor 250. Rotation of rotor 250 may induce rotation of second wobble plate 253, and engagement of the second wobble plate with reaction gear 255 may induce nutation of the second wobble plate.

In such an example, the wobble angles of the first and second wobble plates 252, 253 may lie in different planes. The points of closest approach of the wobble plates may be aligned or may be out of phase 90 degrees. As the wobble plates nutate, the point of closest approach of first wobble plate 252 may maintain the same phase shift relative to the point of closest approach of second wobble plate 253.

As shown in FIG. 9, a cross-sectional view of VED 216, first wobble plate 252 rotates without a bearing around alignment sleeve 256 and second wobble plate 253 rotates without a bearing around shoulder 258 of alignment plate 257. Shoulder 258 has a cylindrical shape and diameter matching alignment sleeve 256, and the two are aligned along central axis 260. Together the alignment sleeve and shoulder both support and axially align the wobble plates.

Alignment sleeve 256 and alignment plate 257 are each fixed relative to housing 264, as are first reaction gear 254 and second reaction gear 255. Alignment sleeve 256 and first reaction gear 254 are fixed to stator housing 268. Alignment plate 257 and second reaction gear 255 are fixed to drive housing 266. In the present example, the housing, alignment components, and reaction gears are bolted together.

Alignment sleeve 256 is spaced from shoulder 258 of alignment plate 257, and rotor 250 extends between the two. An outer surface of each of the sleeve and the shoulder may be sloped and/or curved from a widest point distal from the rotor, radially inward to a narrowest point at an end proximate the rotor. That is, the outer surfaces of shoulder 258 and sleeve 256 are complementarily shaped to an inner surface of each wobble plate 252, 253. The complementary outer and inner surfaces are each curved and deviate from a true cylindrical shape. The curve of the complementary surfaces may be selected to help align each wobble plate 252, 253 at a selected wobble angle and allow smooth rotation at that angle.

Rotor 250 is configured to rotate about central axis 260. The rotor extends between alignment sleeve 256 and alignment plate 257, to a central body 272. Central body 272 is supported by a bearing 274 mounted on drive housing 266. The central body is also rotationally coupled to an output shaft 276, which extends out of drive housing 266 to couple with output gear 218 (See FIGS. 3-5). In the present example, output shaft 276 has first and second splined ends. The first splined end rotationally couples the output shaft to central body 272 of rotor 250, while the second splined end is configured to rotationally couple the output shaft to the output gear.

VED 216 is designed to eliminate eccentric forces, and balance wobble plates 252, 253. Complementary frustoconical shapes urge the wobble plates back into alignment if the brake module experiences vibration or displacement. More specifically, a first and second engaging side of rotor 250 are each frustoconical. That is, each side is angled relative to a plane perpendicular to the central axis 260, so that every point on the surface includes a frustoconical line that can be extended to a vertex located on the central axis, distal from the rotor. When rotor 250 is assembled with first wobble plate 252 and second wobble plate 253, the frustoconical vertex of the first engaging side of the rotor may be proximate a center of mass of the first wobble plate and the frustoconical vertex of the second engaging side may be proximate a center of mass of the second wobble plate.

An engaging surface of each of the first and second reaction gears 254 and 255 is also frustoconical. That is, the surface is angled relative to a plane perpendicular to the central axis 260, so that every point on the surface includes a frustoconical line that can be extended to a vertex located on the central axis, proximal of the stator. When first reaction gear 254 is assembled with first wobble plate 252, the frustoconical vertex of the engaging surface of the first reaction gear may be proximate a center of mass of the first wobble plate. Similarly, when second reaction gear 255 is assembled with second wobble plate 253, the frustoconical vertex of the engaging surface of the second reaction gear may be proximate a center of mass of the second wobble plate.

Wobble plates 252 and 253 each have a proximal face and an opposing distal face relative to rotor 250. Each face is frusticonal. That is, the proximal face and the distal face are each angled relative to a plane perpendicular to the wobble axis, such that every point on the surface includes a frustoconical line that can be extended to a frustoconical vertex located on the wobble axis proximate a center of mass of the wobble plate.

Nutational motion of wobble plates 252, 253 as described above, exerts axial forces. That is, forces parallel to central axis 260 that tend to separate rotor 250 and reaction gears 254, 255. However, the axial forces in VED 216 are balanced by inclusion of two wobble plates. Force exerted by first wobble plate 252 on rotor 250 is balanced by force exerted on the rotor by second wobble plate 253. Rotor 250 may be thereby centered between the wobble plates.

Similarly, axial force exerted by first wobble plate 252 on first reaction gear 254 of is balanced by force exerted on second reaction gear 255 by second wobble plate 253. Housing 264 and VED 216 may therefore not experience a net axial force in either direction along central axis 260. Such balanced forces may allow the VED to be mounted without thrust bearings.

Each of wobble plates 252, 253, reaction gears 254, 255, and rotor 250 include teeth and may be referred to as gears or as including one or more gears. Rotor 250 includes a plurality or set of rotor teeth 280 disposed on each of the first and the second engaging sides. The number of rotor teeth on each side may be equal and may be any appropriate number.

Each rotor tooth 280 may include two engaging faces and each engaging face may be planar, composed of more than one plane, or may be composed of one or more surfaces with curvature. One or both engaging surfaces of a rotor tooth may be defined by a compound involute of a circle and an ellipse, as detailed further below. Alternately, the curve may be the projection of a virtual ellipse onto the tooth location for all angles between 0 and $2\pi$ radians. Each rotor tooth extends from rotor 250 along central axis 260.

First reaction gear 254 and second reaction gear 255 are matching but mirrored in orientation. Each reaction gear includes a plurality or set of reaction teeth 282, disposed on the engaging surface. Reaction teeth 282 extend toward rotor 250, parallel to central axis 260. The number of reaction teeth 282 may be any appropriate number, and may be selected in combination with the shape of the reaction teeth to provide effective engagement between the reaction gear and the corresponding wobble plate. In the depicted example, reaction teeth 282 may be described as wedge-shaped.

First wobble plate 252 and second wobble plate 253 are also matching but mirrored in orientation. A plurality or set of face teeth 284 are disposed on the distal face of each wobble plate. The face teeth are configured to engage reaction teeth 282 of the corresponding reaction gear. Face teeth 284 extend from the distal face in an axial direction along the wobble axis of the wobble plate. In the present example, face teeth 284 are shaped to complement reaction teeth 282 and may be described as wedge-shaped. The number of face teeth 284 may be selected to match the number of reaction teeth 282, to achieve a 1:1 gear ratio, or may be selected to achieve any desired gear ratio.

Each of wobble plates 252, 253 further includes a plurality or set of wobble teeth 286, disposed on the proximal face. The wobble teeth are configured to engage rotor teeth 280 of rotor 250. Wobble teeth 286 extend from the proximal face of the wobble plate in an axial direction along the wobble axis. The number of wobble teeth 286 may be selected to be different from the number of rotor teeth 280 by one, or by a similarly small number. A small difference in the number of teeth may provide high torque density, and increase the ratio of rotations to nutations performed by the wobble plate.

Each wobble tooth 286 includes a first engaging surface, and on the opposite side of the tooth a second engaging surface. Each surface may be planar, composed of more than one plane, or composed of one or more surfaces with curvature. One or both engaging surfaces of a wobble tooth 286 may be defined by a compound involute of a circle and an ellipse, as outlined below. Alternately, the curve may be the projection of a virtual ellipse onto the tooth location for all angles between 0 and 2π radians.

Wobble plates 252, 253 and rotor 250 are each substantially circular in shape, with a projection of each wobble plate onto the rotor being elliptical in shape. The pluralities of wobble teeth 286 and rotor teeth 280 may be contoured by projecting this virtual ellipse onto the tooth location. The elliptical projection of each wobble plate onto the rotor may thereby be constrained to non-eccentric rotation. Eccentric motion, if allowed, may drive large imbalance forces creating unacceptable system performance.

For each tooth of both pluralities of wobble teeth 286 and rotor teeth 280, one or both of the first engaging surface and second engaging surface may be defined by a compound involute of a circle and an ellipse. That is, the curve of each of the first and the second engaging surfaces may be defined by an equation:

$$y = C(\sin(|\varphi|) - |\varphi|\cos(|\varphi|))^D$$

where C is a constant which may be proportional to a radius of the wobble plate, φ may take values from 0 to $$\frac{\pi}{2}$$

radians, and D may have be a positive constant less than 1. D may have a value of approximately 0.65, though other values are also possible. The equation may be normalized to unity, or to a radius of the rotor.

The curve of the first engaging surface may be a mirror image of the curve of the second engaging surface, reflected across a plane through the apex of the tooth and containing the axis of rotation. Also, the first engaging surface and the second engaging surface may meet smoothly at the apex of each tooth. The cross-sectional shape of the tooth may therefore be defined by a compound involute of a circle and an ellipse.

First wobble plate 252 engages both rotor 250 and first reaction gear 254, meshing partially with each. Similarly, second wobble plate 253 engages both rotor 250 and second reaction gear 255, meshing partially with each. Reaction gears 254 remain fixed as wobble plates 252, 253 are induced to nutate by electromagnetic stator assembly 262, thereby causing rotation of the wobble plates. In turn, rotation of the wobble plates may cause rotation of rotor 250 and output shaft 276.

Output of VED 216 may be controlled by actuation of electromagnetic stator assembly 262. Varying the power and phase delivered to the electromagnetic coils of the stator assembly through electrical connectors 263 may in turn vary the nutational speed of wobble plates 252, 253 and therefore the rotational speed of output shaft 276.

Figure 10:
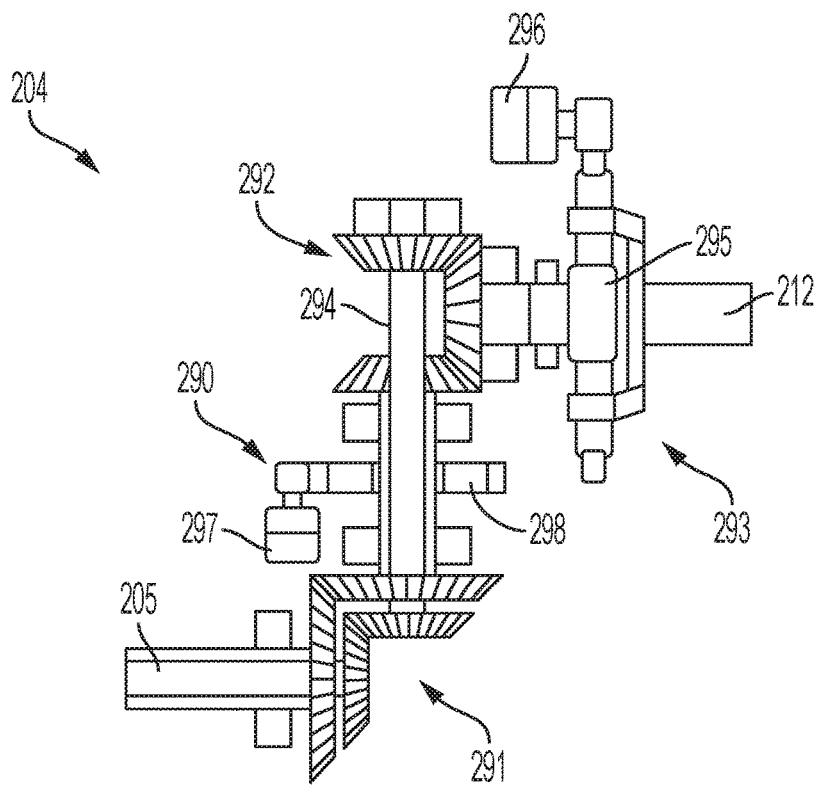
FIG. 10 is a schematic diagram of the aft propulsor drive of the helicopter of FIG. 2.

FIG. 10 schematically depicts aft transmission 204 of the helicopter. The aft transmission includes a first stage 291, a second stage 292, a third stage 293, and a positioning drive 290. The first stage changes the angle of drive from tail drive shaft 205 to an intermediate shaft 294. In the second stage, intermediate shaft 294 drives a sun gear 295 of the planetary third stage. The shafts of the aft transmission's stages and positioning drive are counter-rotating relative to each other. Such configuration divides out the power from the tail drive shaft which reduces weight and size requirements of the transmission stages. The counter-rotation also balances out any significant torque reaction at the positioning drive, which reduces need for support hardware.

Similarly to the main transmission as described above, the third stage further includes a ring gear which engages a VED 296. The VED may be actuated to continuously vary an output speed of aft transmission 204 to tail rotor 212. Positioning drive 290 also includes a VED 297 engaging an annular gear 298. However, in contrast to VED 296 of third stage 293 and the VEDs of the main transmission, VED 297 of positioning drive 290 acts as an orientational control for the tail rotor rather than varying the rotor speed. Third stage 293 may also be described as a variable speed transmission, and positioning drive 290 may be described as an intermediate transmission. The intermediate or second transmission may then be described as configured to rotate the variable speed or first transmission.

Annular gear 298 is mechanically linked to the second stage of aft transmission 204, such that rotation of the annular gear results in rotation of second stage 292, third stage 293, and tail rotor 212. Tail rotor 212 is rotated about an axis parallel to intermediate shaft 294, different from a primary axis of rotation of the rotor. VED 297 may be actuated by the flight controls to rotate annular gear 298 a selected fraction of a revolution. A pilot of the helicopter may thereby control a thrust direction of tail rotor 212.

B. Illustrative Method of Varying Transmission Speed

Figure 11:
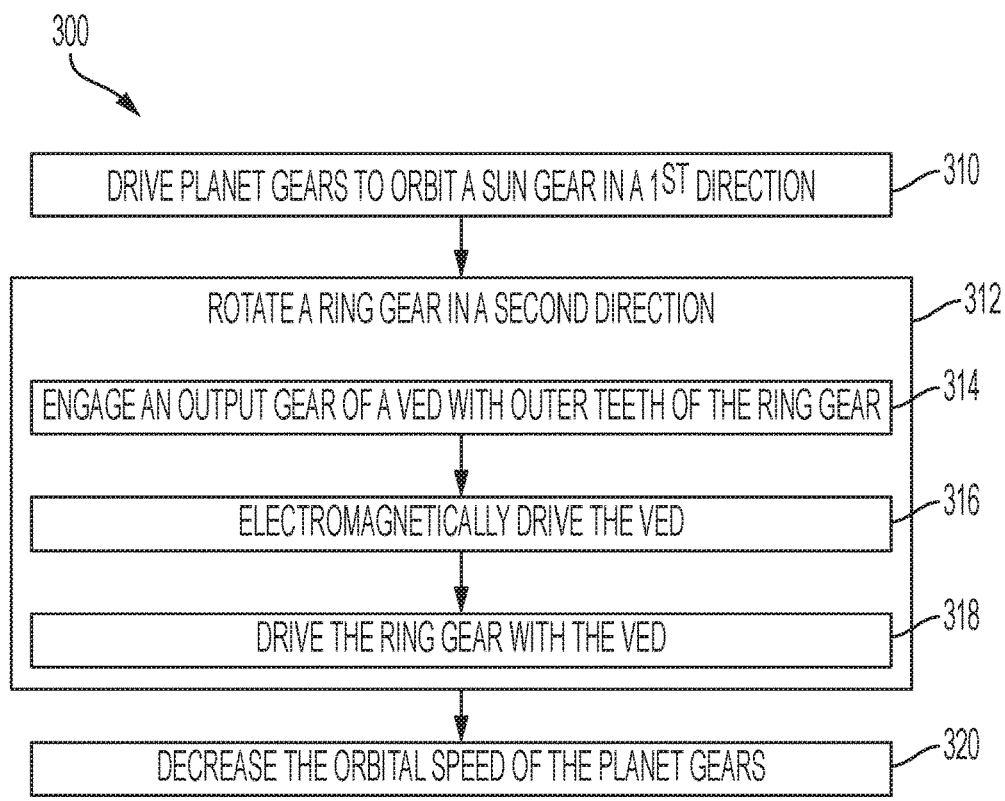
FIG. 11 is a flow chart depicting steps of an illustrative method for varying the speed of a planetary gear system according to the present teachings.

This section describes steps of an illustrative method for varying the speed of the planetary gear system of a transmission; see FIG. 11. Aspects of transmissions described above may be utilized in the method steps described below. Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method 300, and may not recite the complete process or all steps of the method. Although various steps of method 300 are described below and depicted in FIG. 11, the steps need not necessarily all be performed, and in some cases may be performed simultaneously or in a different order than the order shown.

At step 310, the method includes driving planet gears to orbit a sun gear in a first direction. The planet gears and sun gear may both be part of the planetary gear system of the transmission. The sun gear may be driven to rotate by an engine or motor, either directly or through preceding stages of the transmission. Rotation of the sun gear and engagement of the sun gear with the planet gears may cause the planet gears to rotate. The planet gears may also engage with a ring gear, which may urge the rotating planet gears to orbit the sun gear.

Step 312 of the method includes rotating the ring gear in a second direction. That is, the method includes rotating the ring gear in the direction opposite the orbit of the planet gears. Rotation of the ring gear may be accomplished by any effective method. In the present example, sub-step 314 includes engaging an output gear of a Virtual Elliptical Drive (VED) with teeth disposed on an outer circumferential side of the ring gear.

The VED may be any drive of sufficient torque density which includes a pericyclic gear set and an electromagnetic drive, such as VED 216 described in Example A, above. Sub-step 316 includes electromagnetically driving the VED, which may include actuating the electromagnetic drive of the VED to induce nutation and rotation of the pericyclic gearing. Sub-step 318 includes driving the ring gear with the VED, which may be accomplished by driving the VED to rotate the output gear engaged with the ring gear.

Step 320 includes decreasing the orbital speed of the planet gears. Rotation of the ring gear in the opposite direction of the orbit of the planet gears may decrease the orbital speed of the planet gears. More specifically, engagement of the planet gears with the ring gear transforms the rotation of the planet gears into orbital motion. Therefore, altering the reference frame of that transformation by rotating the ring gear alters the transformation of rotational motion to orbital motion and thus reduces the orbital speed of the planet gears.

The speed of the ring gear may be varied by controlling the VED, which may in turn allow controlled variation of the orbital speed of the planet gears and an associated output speed of the transmission.

Illustrative Combinations and Additional Examples

This section describes additional aspects and features of variable speed transmissions, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A variable speed transmission system, comprising:
a transmission apparatus including a planetary gear set having a ring gear and a sun gear,
a primary engine for powering the sun gear,
a braking device engaging the ring gear, and
a controller configured to alter the rotational speed of the ring gear by adjusting the braking device.

A1. The system of A0, wherein the planetary gear set includes a set of planet gears that orbit the sun gear in a first rotational direction, the braking device having a neutral mode and a drive mode, wherein the ring gear is stationary when the braking device is in the neutral mode, and the braking device driving the ring gear in a second rotational direction, opposite from the first rotational direction, when the braking device is in the drive mode.

A2. The system of A1, wherein the braking device includes a virtual elliptical drive.

A3. The system of A2, wherein the virtual elliptical drive includes a pair wobble plates that nutate when the braking device is in the drive mode.

A4. The system of any of A0-A3, wherein the ring gear has an outer circumferential side, and a first set of teeth on the outer circumferential side, the braking device including an output gear engaging the first set of teeth.

A5. The system of A4, wherein the braking device includes a plurality of virtual elliptical drives, each virtual elliptical drive including an output gear engaging the first set of teeth on the ring gear.

A6. The system of A4 or A5, wherein the ring gear has a second set of teeth on an internal side for engaging a set of planet gears inside the ring gear.

A7. The system of any of A0-A6, wherein the braking device includes an electromagnet.

A8. The system of any of A0-A7, wherein the transmission apparatus is configured for driving a propulsor on a rotorcraft.

B0. A rotorcraft, comprising:
a main body portion,
an engine contained in the main body portion,
a first transmission assembly connected to the engine, including a planetary gear set having a planetary ring structure engaging a set of planet gears that orbit a sun gear in a first rotational direction, and
a first virtual elliptical drive engaging teeth on an outer circumferential side of the planetary ring structure, and configured to adjust a rotational speed of the planetary ring structure.

B1. The rotorcraft of B0, wherein the virtual elliptical drive includes a pair of nutating wobble plates.

B2. The rotorcraft of B0 or B1, wherein the first virtual elliptical drive has a neutral mode and a drive mode, wherein the planetary ring structure is stationary when the first virtual elliptical drive is in the neutral mode, and the first virtual elliptical drive drives the planetary ring gear in a second rotational direction, opposite from the first rotational direction, when the first virtual elliptical drive is in the drive mode.

B3. The rotorcraft of any of B0-B2, wherein the rotorcraft is a helicopter, and the engine and first transmission assembly are configured to drive a shaft-driven main lift rotor of the helicopter.

B4. The rotorcraft of any of B0-B3, wherein the engine and first transmission assembly are configured to drive an aft propulsor.

B5. The rotorcraft of B4, further comprising:
a second transmission assembly including a second virtual elliptical drive, the second transmission assembly configured to rotate the first transmission assembly.

C0. A method of varying speed of a planetary gear system, comprising:
driving planet gears to orbit a sun gear in a first rotational direction, the planet gears engaging a stationary ring gear, and varying the orbital speed of the planet gears by driving the ring gear in a second rotational direction, opposite from the first rotational direction.

C1. The method of C0, wherein the ring gear is driven by one or more virtual elliptical drives.

C2. The method of C1, wherein each of the one or more virtual elliptical drives has a pair of wobble plates that nutate during the step of varying the orbital speed of the planet gears.

C3. The method of C1 or C2, further comprising:
electromagnetically driving the one or more virtual elliptical drives.

C4. The method of any of C1-C3, wherein each of the one or more virtual elliptical drives includes an output gear that engages teeth on an outer circumferential side of the ring gear.

D0. A vehicle including the variable speed transmission system of any of A0-A7.

D1. The vehicle of D0, wherein the vehicle is unmanned.

D2. The vehicle of D0, wherein the vehicle is manned.

D3. The vehicle of any of D0-D2, wherein the vehicle is a tracked vehicle.

D4. The vehicle of any of D0-D2, wherein the vehicle is a wheeled vehicle.

D5. The vehicle of any of D0-D2, wherein the vehicle is an aircraft.

D6. The vehicle of any of D0-D2, wherein the vehicle is a watercraft.

E0. A variable speed transmission system, comprising:
a transmission apparatus including a planetary gear set having a ring gear,
an electromagnetic drive engaging the ring gear,
a positive engagement brake, and
a controller configured to alter the rotational speed of the ring gear by adjusting the electromagnetic drive and the positive engagement brake.

E1. The system of E0, wherein the positive engagement brake is in-line with the electromagnetic drive.

E2. The system of E0, wherein the positive engagement brake engages the ring gear directly.

E3. The system of any of E0-E2, wherein the positive engagement brake is a toothed brake and is one of (a) electromagnetically actuated or (b) hydraulically actuated.

E4. The system of any of E0-E3, wherein the transmission apparatus has a full power mode in which the electromagnetic drive is unpowered, and the positive engagement brake prevents rotation of the ring gear.

E5. The system of any of E0-E4, wherein the transmission apparatus has a reduced power mode in which the electromagnetic drive is powered, and the positive engagement brake permits rotation of the ring gear.

Advantages, Features, and Benefits

The different examples of transmissions described herein provide several advantages over known solutions for varying engine output speeds. For example, illustrative examples described herein allow a continuously variable transmission output speed, variable through a wide range.

Additionally, and among other benefits, illustrative examples described herein operate by positive engagement, avoiding the drawbacks of friction-based mechanisms.

Additionally, and among other benefits, illustrative examples described herein vary speed at the main planetary output stage of a transmission, allowing speeds of accessory and/or secondary drives to remain constant and thereby improve efficiency.

Additionally, and among other benefits, illustrative examples described herein improve flight performance, power-to-weight ratios, and safety in rotorcraft.

Additionally, and among other benefits, illustrative examples described herein improve fuel efficiency, increase operating range, and reduce maintenance costs for vehicles.

Additionally, and among other benefits, illustrative examples described herein are scalable and adaptable to a variety of drive configurations.

No known system or device can perform these functions, particularly with the high power and torque needed for rotorcraft transmissions. Thus, the illustrative examples described herein are particularly useful for multi-flight-mode rotorcraft. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A variable speed transmission system, comprising:
a first transmission apparatus including a planetary gear set having a ring gear and a sun gear,
a primary engine for powering the sun gear,
a braking device engaging the ring gear, and
a controller configured to alter the rotational speed of the ring gear by adjusting the braking device,
wherein the braking device includes a virtual elliptical drive and a positive engagement brake, the positive engagement brake preventing rotation of the ring gear when engaged.

2. The system of claim 1, wherein the planetary gear set includes a set of planet gears that orbit the sun gear in a first rotational direction, the braking device having a neutral mode and a drive mode, wherein the ring gear is stationary when the braking device is in the neutral mode, and the braking device driving the ring gear in a second rotational direction, opposite from the first rotational direction, when the braking device is in the drive mode.

3. The system of claim 2, wherein the virtual elliptical drive includes a pair of wobble plates that nutate when the braking device is in the drive mode.

4. The system of claim 1, wherein the ring gear has an outer circumferential side, and a first set of teeth on the outer circumferential side, the braking device including an output gear engaging the first set of teeth.

5. The system of claim 4, wherein the braking device includes a plurality of virtual elliptical drives, each virtual elliptical drive including an output gear engaging the first set of teeth on the ring gear.

6. The system of claim 4, wherein the ring gear has a second set of teeth on an internal side for engaging a set of planet gears inside the ring gear.

7. The system of claim 1, wherein the braking device includes an electromagnet.

8. The system of claim 1, wherein the transmission apparatus is configured for driving a propulsor on a rotorcraft.

9. The system of claim 1, further including a second transmission apparatus having a second virtual elliptical drive, wherein the second transmission apparatus is configured to rotate the first transmission apparatus.

10. The system of claim 1, wherein the transmission system has an output speed range between 50% and 110% of a rated output speed of the primary engine and the transmission apparatus.

11. A rotorcraft, comprising:
a main body portion,
an engine contained in the main body portion,
a first transmission assembly connected to the engine, including a planetary gear set having a planetary ring structure engaging a set of planet gears that orbit a sun gear in a first rotational direction, and a first virtual elliptical drive engaging teeth on an outer circumferential side of the planetary ring structure, and configured to adjust a rotational speed of the planetary ring structure, wherein the engine and first transmission assembly are configured to drive an aft propulsor.

12. The rotorcraft of claim 11, wherein the virtual elliptical drive includes a pair of nutating wobble plates.

13. The rotorcraft of claim 11, wherein the first virtual elliptical drive has a neutral mode and a drive mode, wherein the planetary ring structure is stationary when the first virtual elliptical drive is in the neutral mode, and the first virtual elliptical drive drives the planetary ring structure in a second rotational direction, opposite from the first rotational direction, when the first virtual elliptical drive is in the drive mode.

14. The rotorcraft of claim 11, wherein the rotorcraft is a helicopter, and the engine and first transmission assembly are configured to drive a shaft-driven main lift rotor of the helicopter.

15. The rotorcraft of claim 11, further comprising:
a second transmission assembly including a second virtual elliptical drive, the second transmission assembly configured to rotate the first transmission assembly.

16. The rotorcraft of claim 11, wherein the first virtual elliptical drive is one of a plurality of virtual elliptical drives, each virtual elliptical drive including an output gear engaging the teeth on the outer circumferential side of the planetary ring structure.

17. A method of varying speed of a planetary gear system, comprising:
driving planet gears to orbit a sun gear in a first rotational direction, the planet gears engaging a stationary ring gear, and
varying the orbital speed of the planet gears by driving the ring gear in a second rotational direction, opposite from the first rotational direction,
engaging a brake to mechanically lock the ring gear, wherein the ring gear is driven by one or more virtual elliptical drives.

18. The method of claim 16, wherein each of the one or more virtual elliptical drives has a pair of wobble plates that nutate during the step of varying the orbital speed of the planet gears.

19. The method of claim 16, further comprising:
electromagnetically driving the one or more virtual elliptical drives.

20. The method of claim 16, wherein each of the one or more virtual elliptical drives includes an output gear that engages teeth on an outer circumferential side of the ring gear.

* * * * *